United States Patent
Wong

[11] Patent Number: 5,767,391
[45] Date of Patent: Jun. 16, 1998

[54] LEAKAGE DETECT TOOL FOR VACUUM BELLOWS

[75] Inventor: Midas Wong, Hsin chu Hsien, Taiwan

[73] Assignee: Taiwan Semiconductor Manufacturing Company, Ltd., Hsin-chu, Taiwan

[21] Appl. No.: 756,087

[22] Filed: Nov. 25, 1996

[51] Int. Cl.$^6$ .............................. G01M 3/04; G01M 3/20
[52] U.S. Cl. .............................................. 73/40.7; 73/40
[58] Field of Search .................................. 73/40.7, 40, 49

[56] References Cited

U.S. PATENT DOCUMENTS

| | | | |
|---|---|---|---|
| 4,492,110 | 1/1985 | Bergquist | 73/40.7 |
| 4,735,084 | 4/1988 | Fruzzetti | 73/40.7 |
| 4,776,207 | 10/1988 | Holme | 73/40.7 |
| 4,779,449 | 10/1988 | Bley et al. | 73/40.7 |
| 4,785,666 | 11/1988 | Bergquist | 73/40.7 |
| 4,813,268 | 3/1989 | Helvey | 73/40.7 |
| 5,010,761 | 4/1991 | Cohen et al. | 73/40.7 |
| 5,172,583 | 12/1992 | Tallon | 73/40.7 |
| 5,251,471 | 10/1993 | Minten | 73/40 |
| 5,369,982 | 12/1994 | Holthaus | 73/40 |
| 5,375,456 | 12/1994 | Burns | 73/40.7 |
| 5,386,717 | 2/1995 | Toda | 73/40.7 |
| 5,625,141 | 4/1997 | Mahoney et al. | 73/40.7 |

Primary Examiner—Michael Brock
Assistant Examiner—J. David Wiggins
Attorney, Agent, or Firm—George O. Saile; Stephen B. Ackerman

[57] ABSTRACT

A leakage detect tool, a system and method for the testing of gas leakage from a vacuum bellows is described. The leakage detect tool has a main cylindrical pipe having an auto-stop plate at one end of the main cylindrical pipe and a main flange at the other end of the main cylindrical pipe. A secondary cylindrical pipe is attached to the side wall of the main cylindrical pipe at an angle. A secondary flange is attached to the secondary cylindrical pipe at the end opposite the main cylindrical pipe. A vacuum bellows is placed within the main cylindrical pipe, a top flange seals the vacuum bellows to the main flange, and a test gas (tracer gas) is instilled to inflate the vacuum bellows. An interior space between the vacuum bellows and the side wall of the main cylindrical pipe is evacuated by a vacuum pump that is coupled to the secondary flange. A test gas detector is coupled to the secondary flange and activated to detect the presence of the test gas in the interior space of the main cylindrical pipe. If there is a presence of the test gas or tracer gas in the interior space, the vacuum bellows has damage or defects.

27 Claims, 5 Drawing Sheets

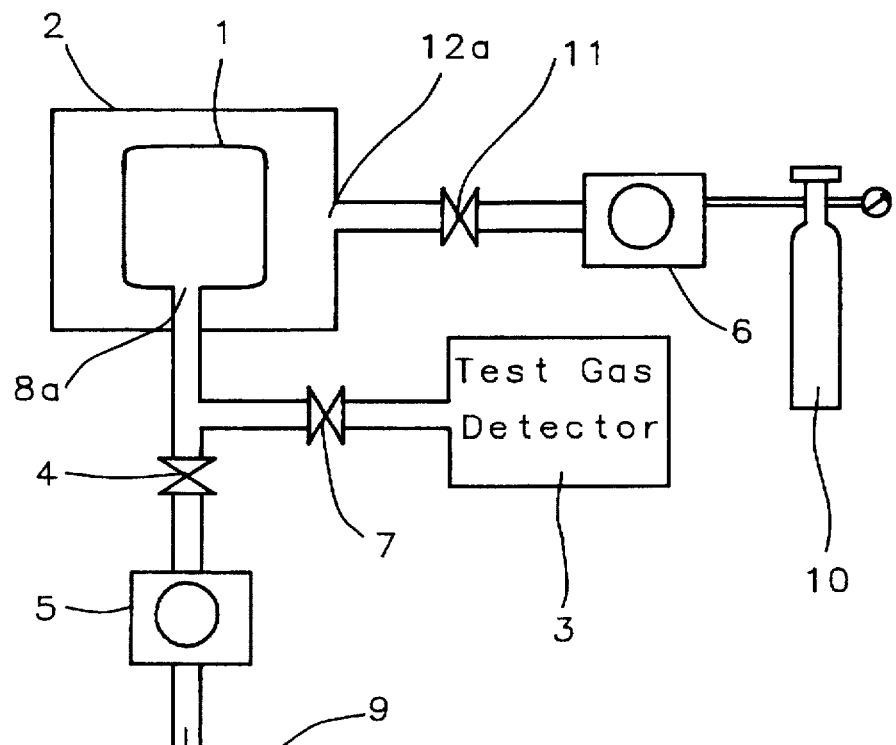
*FIG. 1 - Prior Art*
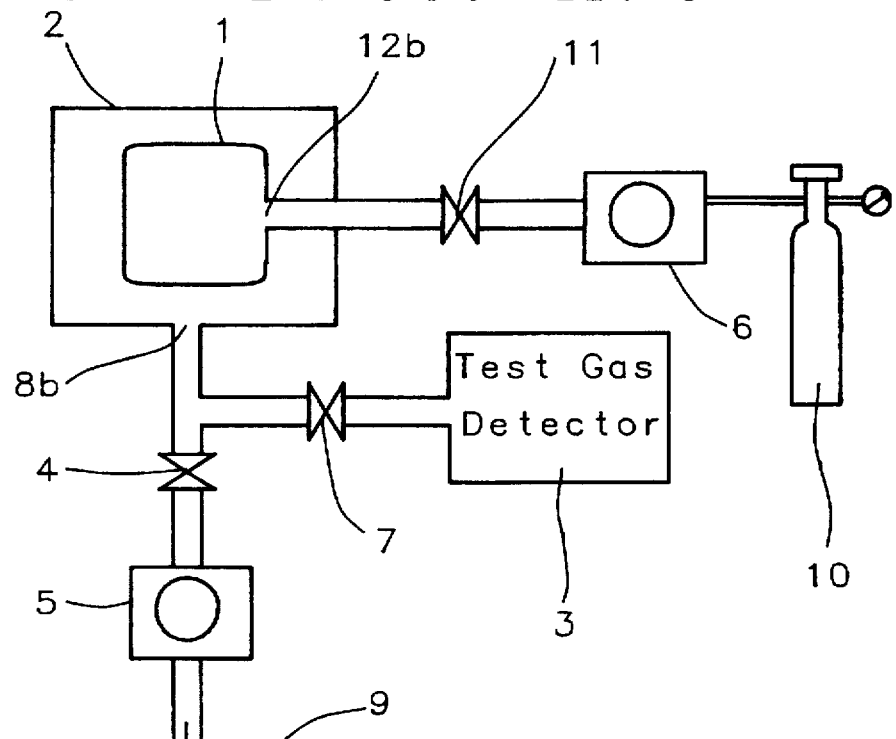
*FIG. 2 - Prior Art*

5,767,391

LEAKAGE DETECT TOOL FOR VACUUM BELLOWS

BACKGROUND OF THE INVENTION

1. Field of the Invention

This invention relates to devices and methods for the testing for leakage caused by defects and damage to materials of a vacuum bellows.

2. Description of Related Art

Most gas leakage test devices and methods involve two basic structures and procedures as shown in FIGS. 1 and 2.

The first method as shown in FIG. 1 has a testing specimen 1 placed in a testing chamber or testing area 2 and a pressurized gas 10 such a helium pumped or blown by pump 6 through valve 11 into the testing chamber or testing area 2 at coupling 12a. Meanwhile, the testing specimen is connected at coupling 8a through a pipe to valve 4 to vacuum pump 5. Valve 7 is also connected to coupling 8a through a second pipe that is joined to the first pipe. A test gas detector 3 is connected to the valve 7.

To test for leakage in the test specimen 1, the valve 7 is closed, the valve 4 is opened, and the vacuum pump 5 is activated to pump any air or gas present from the test specimen 1. The air or gas is exhausted 9 from the vacuum pump 5. When the test specimen 1 is evacuated, the vacuum pump 5 is deactivated and valve 4 is closed. Valve 11 is opened and pump 6 is activated to pump or blow the test gas 10 into the test chamber or test area 2. The valve 7 is opened to sample or "sniff" the atmosphere within the test specimen 1. If there is damage to the materials or the structure of the test specimen 1 or if there is a defect in the materials or the structure of the test specimen 1, the test gas 10 will be detected by the test gas detector 3 as present in the atmosphere of the test specimen 1. The test gas detector 3 may actually have a "sniffer" probe that will be inserted at coupling 8a of the test specimen 1 as opposed to being coupled by piping and valve 7.

An alternate device and method is shown in FIG. 2. The test specimen 1 again is placed within the test chamber or test area 2. A test gas 10 such as helium is now pumped or blown into the test specimen 1 by pump 6 through valve 11 into the test specimen 1 at coupling 12a. Meanwhile, the test chamber or test area 2 is connected at coupling 8b through a first piping to valve 4 to the vacuum pump 5. Valve 7 is connected through a second piping that is joined to the first piping to the coupling 8b. A test gas detector 3 is connected to the valve 7.

To test for leakage valve 4 is opened and the vacuum pump 5 is activated to evacuate the test chamber or the test area 2. The air or gas 9 is exhausted from the vacuum pump 5. When the test chamber or test area 2 is evacuated, the vacuum pump 5 is deactivated and valve 4 is closed. Valve 11 is opened and pump 6 will pump or blow the test gas 10 into the test specimen 1 through coupling 12b. Valve 7 will be opened and the test gas detector will be activated to sample or "sniff" the atmosphere within the test chamber or test area 2. If there is damage to the materials or the structure of the test specimen 1 or if there is a defect in the materials or the structure of the test specimen 1, the test gas 10 will be detected by the test gas detector 3 as present in the atmosphere of the test chamber or test area 2. The test gas detector 3 may actually have a "sniffer" probe that will be inserted at coupling 8b of the test chamber or test area 2 as opposed to being coupled by piping and valve 7.

U.S. Pat. No. 5,386,717 (Toda) illustrates a device and method that combines the devices and methods of FIGS. 1 and 2. The atmosphere of the test specimen 1 and the test chamber 2 both may have naturally occurring back ground levels of the test gas 10. To eliminate or minimize the background levels of the test gas 10, the test chamber 2 is evacuated and then filled with a sampling gas. This process of evacuating and filling the test chamber 2 with a sampling gas is repeated until the background levels of the test gas 10 are sufficiently low as to not confound the test for leakage within the test specimen 1. The test chamber 2 is evacuated a final time, the test specimen 1 has the test gas 10 blown or pumped in, and the test gas detector 3 is activated to test for test gas 10 leaked from the test specimen 1.

Vacuum bellows for use in high vacuum machinery used in semiconducting processing are to seal the various activating mechanisms within the vacuum machinery from the outside atmosphere. The activating mechanisms include the cylinder activators and valve opening and closing devices within the vacuum chamber of the vacuum machinery. Damage to the vacuum bellows occurs due to tension and compression of the bellows during operation.

If the bellows is placed within a chamber as described in FIG. 2 and a "sniffer" probe is used at the entrance coupling 8b, the pumping of the test gas 10 into the bellows may cause the bellows to become expanded into the "sniffer" probe or be over inflated, such that the bellows may be damaged.

U.S. Pat. No. 5,251,471 (Minten) describes an apparatus to test for leakage in the bellows coupling for marine stern drive motors. Sealing plugs are placed in both ends of the bellows with a spring placed within the bellows between the sealing plugs. An air hose is connected to a coupling in one of the sealing plugs and the bellows is inflated. If there is a leak in the bellows, the spring applies an outward force that will force the bellows to retract toward the uninflated state, allowing detection of the leak.

SUMMARY OF THE INVENTION

An object of this invention is to provide a system for the detection of defects and damage that can cause the loss of vacuum from a bellows. Further another object of this invention is to prevent damage to bellows during the testing of the bellows for leakage.

To accomplish these and other objects, a system to test and detect damage and defects that cause leaks within a vacuum bellows has a leak detect tool to hold the vacuum bellows, a top flange to secure the vacuum bellows to the leakage detect tool via a coupling flange attached to one end of such bellows, a test gas pump coupled to the top flange to pump the test gas to inflate the vacuum bellows, a vacuum pump coupled to the leakage detection tool to evacuate an interior space that is between a side wall of the leakage detect tool and the vacuum bellows, and a test gas detector coupled to the leakage detect tool to detect any test gas that has leaked into the interior space as a result of defects or damage to the materials of the vacuum bellows.

The leakage detect tool is comprised of a main cylindrical pipe. A main flange is attached to one end of the main cylindrical pipe to accept and couple the vacuum bellows with a coupling flange as it is placed within the main cylindrical pipe. The main flange is coupled to the top flange to seal the vacuum bellows and allow the test gas to be pumped into the vacuum bellows.

An auto-stop plate is placed in the end of the main cylindrical pipe opposite the main flange to seal the end of the cylindrical pipe and to prevent over expansion of the vacuum bellows when the test gas is pumped into the bellows.

A secondary cylindrical pipe is attached to the side wall of the main cylindrical pipe at an angle. A secondary flange is attached to the end of the secondary cylindrical pipe opposite the end attached to the main cylindrical pipe. The secondary flange is coupled to the vacuum pump and the test gas detector. The secondary cylindrical pipe and the secondary flange will prevent the test gas leak detector from impinging upon the vacuum bellows and causing damage to the vacuum bellows.

BRIEF DESCRIPTION OF THE DRAWINGS

FIGS. 1 and 2 are schematic diagrams of conventional methods for gas leakage detection of prior art.

DETAILED DESCRIPTION OF THE INVENTION

Figure 3:
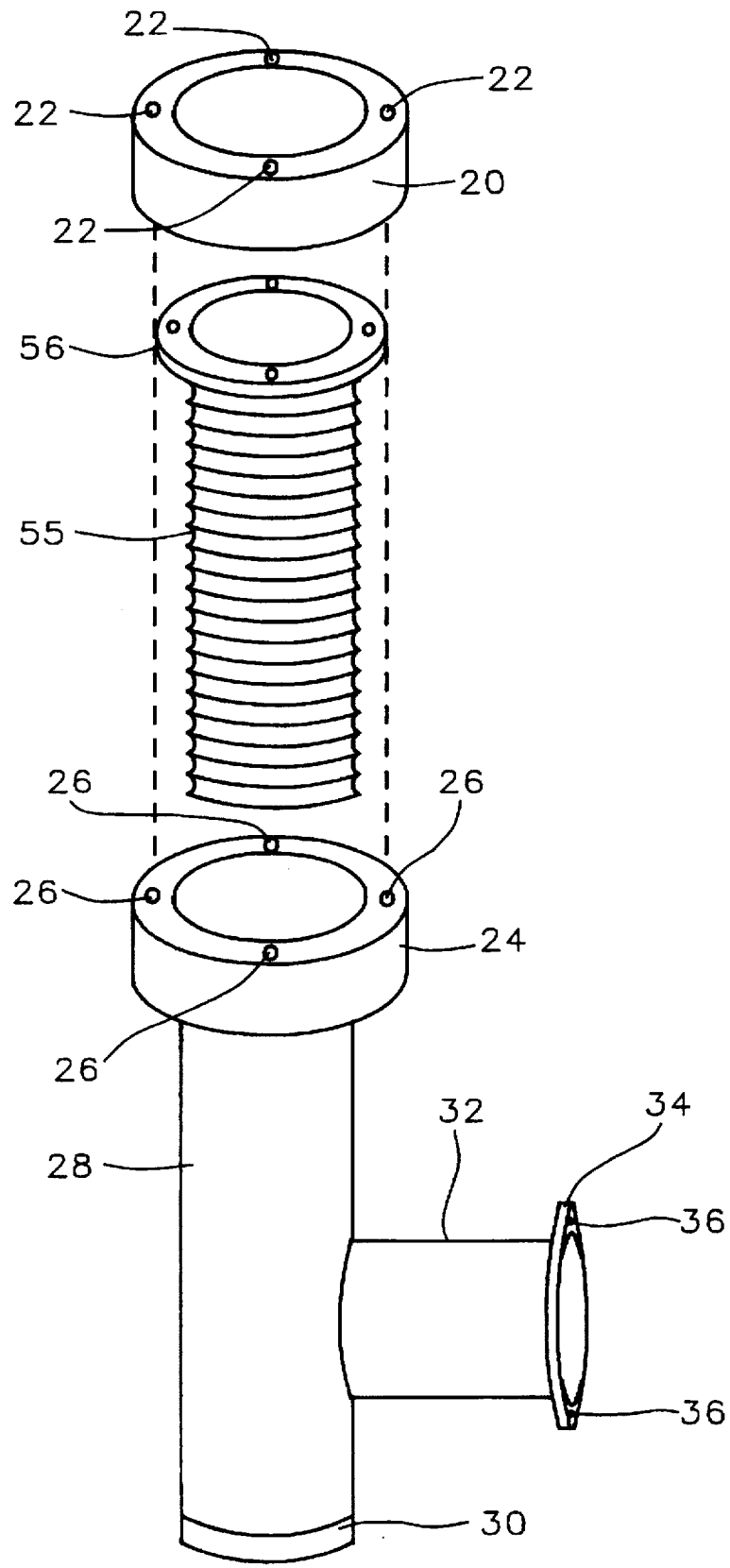
FIG. 3 is a drawing of a leakage detect tool of this invention.

Referring to FIG. 3 the leakage detect tool of this invention has a main cylindrical pipe 28 that has sufficiently large interior space to accommodate a vacuum bellows that is to be tested for leakage. The interior space must allow for expansion of the vacuum bellows 55 while not permitting the vacuum bellows 55 to over expand and cause damage to the vacuum bellows. An auto-stop plate 30 is affixed to a bottom end of the main cylindrical pipe 28 to seal the main cylindrical pipe 28 from the external atmosphere and to prevent expansion of the vacuum bellows 55 from the bottom end of the main cylindrical pipe 28.

A main flange 24 is attached to the end of the main cylindrical pipe 28 at the end opposite the auto-stop plate 30. The main flange 24 is a circular ring having an inside diameter sufficiently large as to allow the vacuum bellows 55 to be placed within the main cylindrical pipe 28, but still of a size and shape as to seal the vacuum bellows 55 via its coupling flange 56 from the interior space of the main cylindrical pipe 28. Coupling devices 26 will allow the top flange 20 to be placed on the main flange 24 to allow a source of a test gas, such as helium, to be coupled to the top flange 20 at coupling points 22. This is to allow the test gas to be pumped into the vacuum bellows during the testing procedure.

A secondary cylindrical pipe 32 is attached to a side of the main cylindrical pipe 28. A secondary flange 34 is attached to the secondary cylindrical pipe 32 at the end opposite the end attached to the main cylindrical pipe 28. The secondary flange has coupling points 36 to allow the connection of a vacuum pump and a test gas leak detector.

Figure 4:
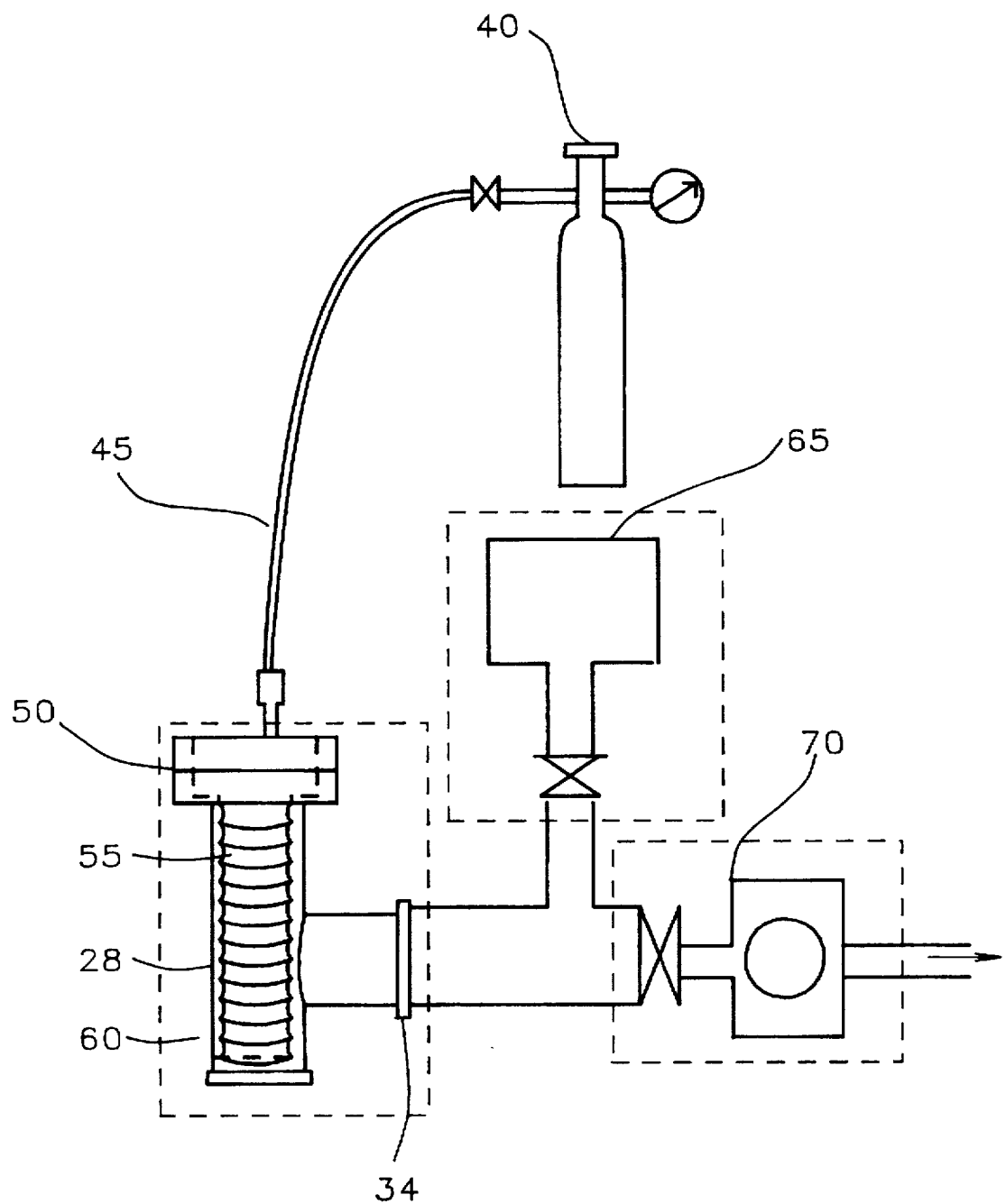
FIG. 4 is a drawing of a leakage detect tool as applied in a leakage detection system of this invention.

Referring now to FIG. 4, the vacuum bellows 55 is placed within the leakage detect tool 60. The top flange 50 attaches to the vacuum bellows 55 and will seal the vacuum bellows 55 within the leakage detect tool 60. A test gas gun 45 will couple a test gas source 40 to the top flange 50.

A test gas detector 65 and a vacuum pump 70 are coupled to the secondary flange 62.

The test gas source 40 will pump the test gas through the test gas gun 45 into the vacuum bellows 55. The vacuum bellows 55 will be inflated within the leakage detect tool 60. The vacuum pump 70 will be activated to evacuate any of the interior space of the leakage detect tool 60 between the side wall of the main cylindrical pipe 28 and the vacuum bellows 55. The test gas detector 65 will sense the presence of the test gas and indicate that the test gas is leaking from the vacuum bellows 55 due to a damage in the structure or defect in the materials of the vacuum bellows 55.

Figure 4A:
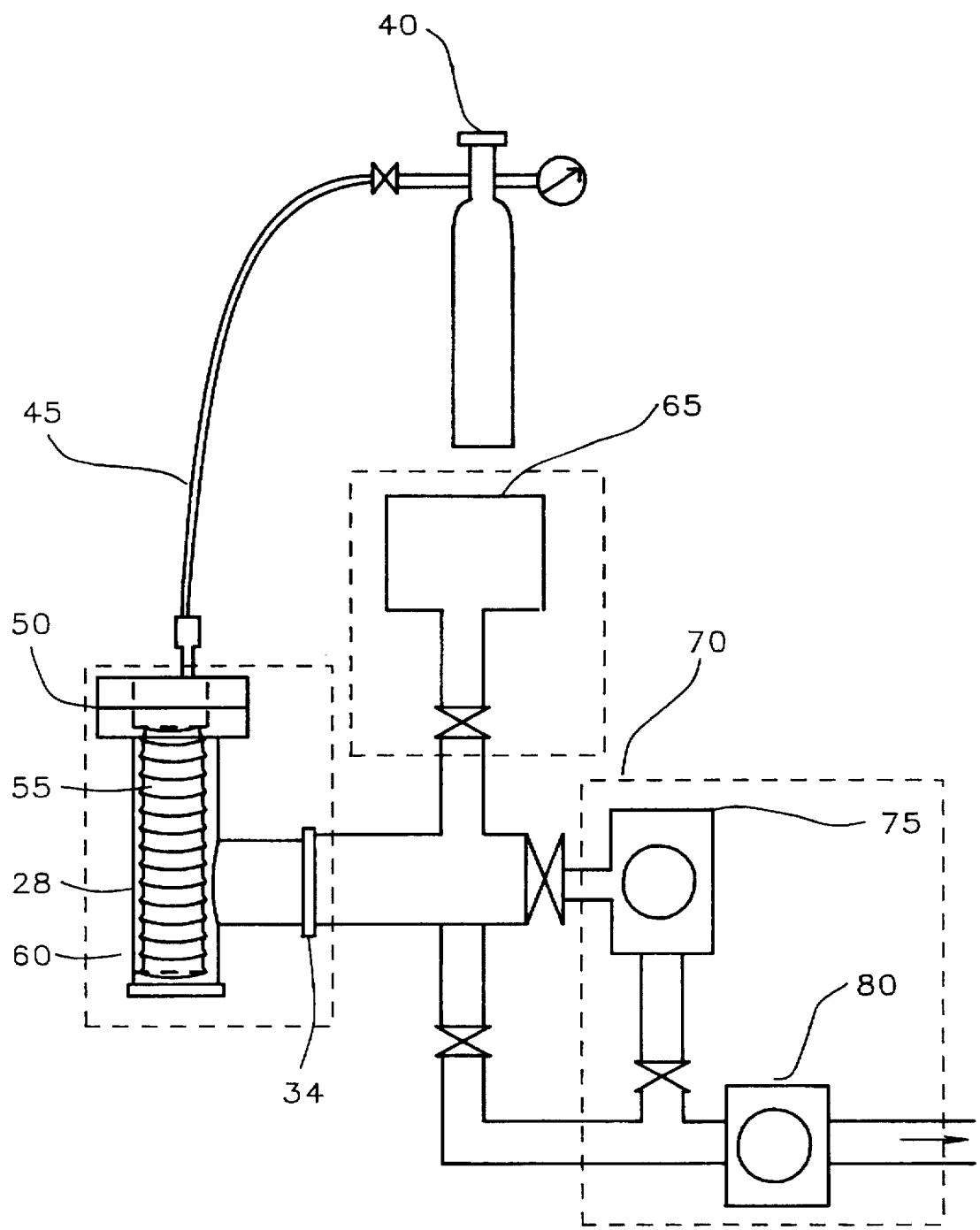
FIG. 4a is a drawing of an embodiment of a leakage detect system using a two stage vacuum pump of this invention.

FIG. 4a shows an embodiment of the leakage detect system of FIG. 4 with the single vacuum pump 70 of FIG. 4 replaced with a dual pump unit or a multiple stage pump 75 and 80. The rotary pump 75 is activated to evacuate the interior space of the leakage detect tool 60 between the side wall of the main cylindrical pipe 28 and the vacuum bellows 55 to a partial vacuum. The rotary pump 75 is deactivated and the high vacuum diffusion pump 80 is activated to complete the evacuation of the interior space of the leakage detect tool 60 between the side wall of the main cylindrical pipe 28 and the vacuum bellows 55 to a more complete vacuum. The high vacuum diffusion pump 80 is then deactivated and the test gas detector 65 is then activated as described above to sense the presence of the test gas and to indicate that the test gas is leaking from the vacuum bellows 55.

Figure 5:
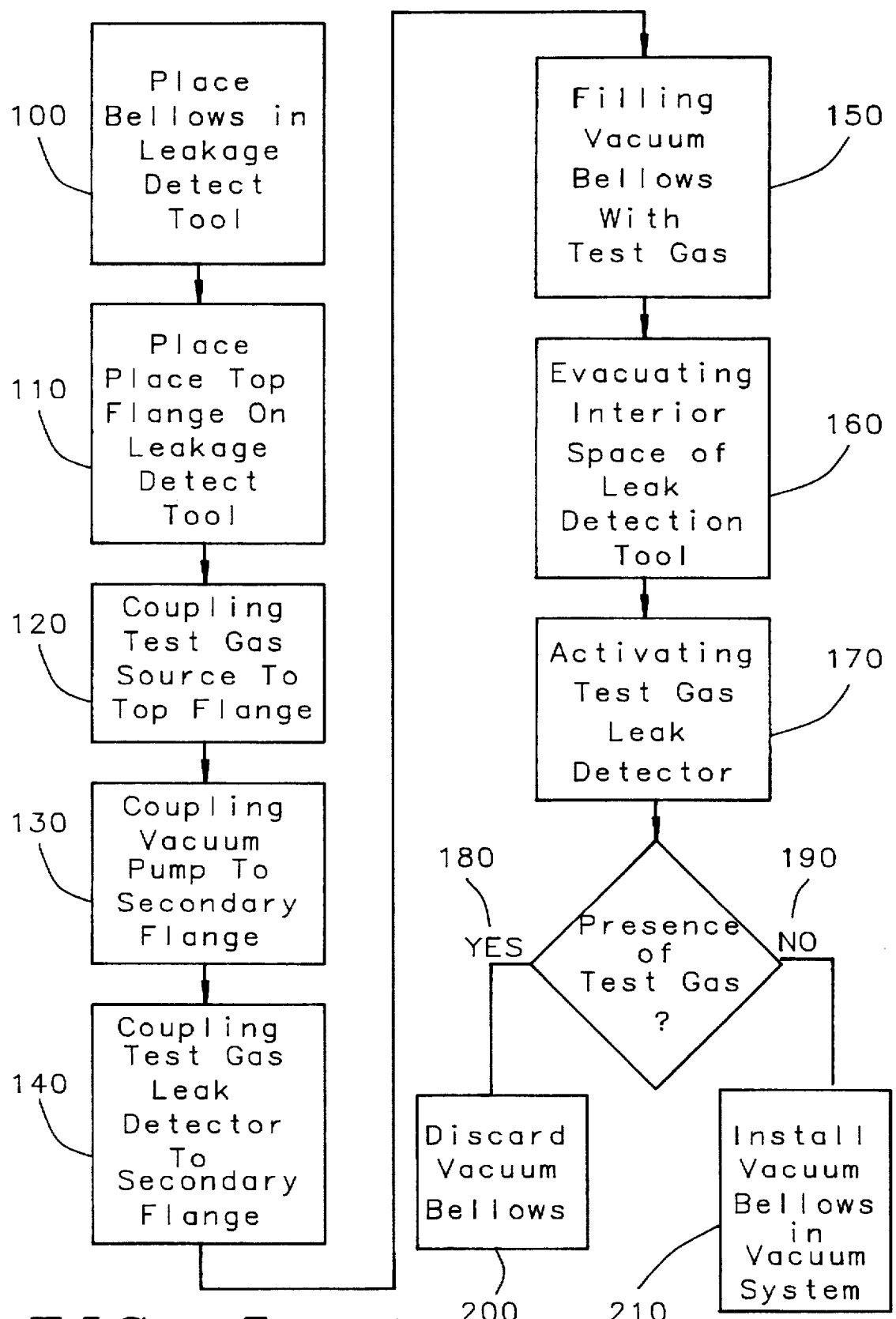
FIG. 5 is flow diagram of the method of leakage detection using a leakage detect tool of this invention.

Referring to FIG. 5, the method for the testing for defects or damage to a vacuum bellows has the following steps:

1. Placing of a vacuum bellows within a leakage detect tool. The leakage detect tool being as described in FIG. 3. 100

2. Placing the top flange upon the leakage detect tool and fastening the bellows against the top flange in an air tight manner to seal the vacuum bellows from the interior space of the leakage detect tool. 110

3. Coupling a test gas source to the top flange to allow a test gas to be pumped into the vacuum bellows. 120

4. Coupling a vacuum pump to the secondary flange of the leakage detect tool. 130

5. Coupling a test gas detector to the secondary flange to sample or "sniff" the presence of the test gas in the interior space of the leakage detect tool. 140

6. Filling the vacuum bellows with the test gas so as to expand the vacuum bellows and provide a high pressure on any damage in the structure or defect in the material of the vacuum bellows which may leak. 150

7. Evacuating the interior space between the vacuum bellows and the side wall of the main cylindrical pipe of the leakage detect tool. 160

8. Activating the test gas detector to sense the presence of the test gas in the interior space in the event that any leakage occurs for the bellows. 170

9. If the presence of the test gas is detected 180, the vacuum bellows is defective or damaged and should be discarded. 200

10. If the presence of the test gas is not detected 190, the vacuum bellows is not defective or damaged and should be installed in the vacuum system 210.

While this invention has been particularly shown and described with reference to the preferred embodiments thereof, it will be understood by those skilled in the art that various changes in form and details may be made without departing from the spirit and scope of the invention.

The invention claimed is:

1. A system to test and detect defects and damage within a bellows that can cause the loss of a vacuum within a vacuum system, wherein said bellows has a hollow cylindrical shape made of a flexible material so as said bellows may expand and contract, a circular end piece to seal a first end of said hollow cylindrical shape, and a coupling flange attached to a second end of the hollow cylindrical shape to couple said bellows to external equipment, comprising:

a) a leakage detect tool to receive said bellows, comprising a main cylindrical pipe with an outside diameter having a side wall, a first end, a second end, and an interior space, into which said bellows will be placed, a main flange having a shape of a circular ring attached to the first end of the main cylindrical pipe, wherein the an inside diameter of said main flange is equal to the outside diameter of the main cylindrical pipe, wherein said main flange has a means to allow attachment of said bellows thereto and is utilized to couple the bellows to said leakage detect tool, an auto-stop plate having a circular shape, is attached to the second end of the main cylindrical pipe to seal the main cylindrical pipe from an outside atmosphere and to prevent said bellows from expanding beyond the main cylindrical pipe, a secondary cylindrical pipe attached to the side wall of the main cylindrical pipe such that the main cylindrical pipe and said secondary cylindrical pipe form an angle at a common joint, and a secondary flange attached to the secondary cylindrical pipe at an end opposite the main cylindrical pipe;

b) a top flange having a shape of a second circular ring employed to attach the coupling flange of said bellows to the leakage detect tool;

c) a test gas source connected to the top flange to instill a test gas within said bellows to cause said bellows to expand;

d) a vacuum pump coupled to the secondary flange to bring the interior space that is between the bellows and the side wall of said main cylindrical pipe to a low pressure; and e) a test gas detector coupled to the secondary flange to detect any presence of said test gas that may have leaked from said bellows indicating the presence of damage to the structure and defect in the material of said bellows.

2. The system of claim 1 wherein said damage and defects is selected from the set of damage and defects that include wear and imperfections in the flexible material, and wear, imperfections, and contamination of the coupling flange.

3. The system of claim 1 wherein the main flange will accept the coupling flange to isolate the hollow cylindrical shape of said bellows from the interior space of the leakage detect tool.

4. The system of claim 1 wherein the auto-stop plate will prevent said bellows from expanding to a point that will cause damage to said bellows.

5. The system of claim 1 wherein the angle formed between the main cylindrical pipe and the secondary cylindrical pipe will prevent the test gas detector from impinging upon the bellows and causing damage to said bellows during testing.

6. The system of claim 1 wherein the testing gas is selected from the set of testing gases that includes helium and the test gas detector may be a helium gas detector.

7. The system of claim 1 wherein the leakage detect tool will have dimensions for the main cylindrical pipe and the main flange that are compatible with the dimensions of the bellows as concerns fitting and attachment of the bellows within said main cylinder pipe.

8. The system of claim 1 wherein the vacuum pump comprises a rotary vacuum pump to first establish a partial vacuum in the interior space and a high vacuum diffusion pump to secondly establish a more complete vacuum in the interior space.

9. A leakage detect tool to detect damage and defects that may cause leakage within a bellows when said bellows is placed within said leakage detect tool, comprising:

a) a main cylindrical pipe with an outside diameter having a side wall, a first end, a second end, and an interior space, into which said bellows will be placed;

b) a main flange having a shape of a circular ring attached to the first end of the main cylindrical pipe, wherein the an inside diameter of said main flange is equal to the outside diameter of the main cylindrical pipe, wherein said main flange is to couple the bellows to said leakage detect tool by means of a coupling flange attached to said bellows;

c) an auto-stop plate having a circular shape, is attached to the second end of the main cylindrical pipe to seal the main cylindrical pipe from an outside atmosphere and to prevent said bellows from expanding beyond the main cylindrical pipe;

d) a secondary cylindrical pipe attached to the side wall of the main cylindrical pipe such that the main cylindrical pipe and said secondary cylindrical pipe form an angle;

e) a secondary flange attached to the secondary cylindrical pipe at an end opposite the main cylindrical pipe; and f) a top flange having a shape of a second circular ring to attach to the coupling flange of said bellows to the leakage detect tool.

10. The leakage detect tool of claim 9 wherein the bellows has a hollow cylindrical shape made of a flexible material so as said bellows may expand and contract, a circular end piece to seal a first end of said hollow cylindrical shape, and a coupling flange attached to a second end of the hollow cylindrical shape to couple said bellows to external equipment.

11. The leakage detect tool of claim 9 wherein a test gas source is connected to the top flange to instill a test gas within said bellows to cause said bellows to expand.

12. The leakage detect tool of claim 9 wherein a vacuum pump is coupled to the secondary flange to bring the interior space that is between the bellows and the side wall of said main cylindrical pipe to a low pressure.

13. The leakage detect tool of claim 9 wherein a test gas detector is coupled to the secondary flange to detect any presence of said test gas that may have leaked from said bellows indicating the presence of damage and defect to said bellows.

14. The leakage detect tool of claim 9 wherein said damage and defects is selected from the set of damage and defects that include wear and imperfections in the flexible material, and wear, imperfections, and contamination of the coupling flange.

15. The leakage detect tool of claim 9 wherein the main flange will accept the coupling flange to isolate the hollow cylindrical shape of said bellows from the interior space of the leakage detect tool.

16. The leakage detect tool of claim 9 wherein the auto-stop plate will prevent said bellows from expanding to a point that will cause damage to said bellows.

17. The leakage detect tool of claim 9 wherein the angle formed between the main cylindrical pipe and the secondary cylindrical pipe will prevent the test gas detector from impinging upon the bellows and causing damage to said bellows during testing.

18. The leakage detect tool of claim 9 wherein the testing gas is selected from the set of testing gases that includes helium and the test gas detector may be a helium gas detector.

19. The leakage detect tool of claim 9 wherein the leakage detect tool will have dimensions for the main cylindrical pipe and the main flange that are compatible with the dimensions of the bellows as concerns fitting and attachment of the bellows within said main cylinder pipe.

20. A method for the detection of defects and damage that will cause leakage and subsequent loss of vacuum in a bellows, comprising the steps of:

a) placing said bellows within a leakage detect tool by means of a coupling flange attached to said bellows, wherein said leakage detect tools comprises:

a main cylindrical pipe with an outside diameter having a side wall, a first end, a second end, and an interior space, into which said bellows will be placed, a main flange having a shape of a circular ring attached to the first end of the main cylindrical pipe, wherein the an inside diameter of said main flange is equal to the outside diameter of the main cylindrical pipe, wherein said main flange is to couple the bellows to said leakage detect tool, an auto-stop plate having a circular shape, is attached to the second end of the main cylindrical pipe to seal the main cylindrical pipe from an outside atmosphere and to prevent said bellows from expanding beyond the main cylindrical pipe, a secondary cylindrical pipe attached to the side wall of the main cylindrical pipe such that the main cylindrical pipe and said secondary cylindrical pipe form an angle, and a secondary flange attached to the secondary cylindrical pipe at an end opposite the main cylindrical pipe;

b) placing a top flange, having a shape of second circular ring, to attach the coupling flange of said bellows to the leakage detect tool;

c) coupling a test gas source to the top flange to instill a test gas within said bellows to cause said bellows to expand;

d) coupling a vacuum pump to the secondary flange to bring the interior space that is between the bellows and the side wall of said main cylindrical pipe to a low pressure;

e) coupling a test gas detector to the secondary flange to detect any presence of said test gas that may have leaked from said bellows indicating the presence of damage and defect to said bellows;

f) filling the bellows with the test gas so as to expand said bellows;

g) evacuating the interior space to bring said interior space to the low pressure;

h) activating the test gas detector to sense the presence of any test gas that may have leaked from said bellows to the interior space;

i) if there is a presence of the test gas detected by the test gas detector, discarding said bellows; and j) if there is not a presence of the test gas detected by the test gas detector, installing said bellows in external equipment.

21. The method of claim 20 wherein the bellows has a hollow cylindrical shape made of a flexible material so as said bellows may expand and contract, a circular end piece to seal a first end of said hollow cylindrical shape, and a coupling flange attached to a second end of the hollow cylindrical shape to couple said bellows to external equipment.

22. The method of claim 20 wherein said damage and defects is selected from the set of damage and defects that include wear and imperfections in the flexible material, wear, imperfections, and contamination of the coupling flange.

23. The method of claim 20 wherein the main flange will accept the coupling flange to isolate the hollow cylindrical shape of said bellows from the interior space of the leakage detect tool.

24. The method of claim 20 wherein the auto-stop plate will prevent said bellows from expanding to a point that will cause damage to said bellows.

25. The method of claim 20 wherein the angle formed between the main cylindrical pipe and the secondary cylindrical pipe will prevent the test gas detector from impinging upon the bellows and causing damage to said bellows during testing.

26. The method of claim 20 wherein the testing gas is selected from the set of testing gases that includes helium and the test gas detector may be a helium gas detector.

27. The method of claim 20 wherein the leakage detect tool will have dimensions for the main cylindrical pipe and the main flange that are compatible with the dimensions of the bellows as concerns fitting and attachment of the bellows within said main cylinder pipe.

* * * * *